Patented Oct. 17, 1950

2,526,537

UNITED STATES PATENT OFFICE 2,526,537

WATER-RESISTANT GYPSUM PRODUCTS AND METHOD OF MAKING

Thomas P. Camp, Arlington Heights, Ill., assignor to United States Gypsum Company, Chicago, Ill., a corporation of Illinois No Drawing. Application November 16, 1946,
Serial No. 710,393

2 Claims. (Cl. 106—116)

The present invention relates to water resistant gypsum products and to a process for preparing the same.

Ordinary gypsum wallboard, gypsum tile, gypsum block, gypsum casts, and the like have very little resistance to water. When ordinary gypsum wallboard, for example, is immersed in water, the board quickly absorbs a considerable amount of water, and loses a great deal of its strength. Actual tests have demonstrated that when a 2″ x 4″ cylinder of gypsum board core material was immersed in water at about 70° F., the cylinder showed a water absorption of 36% after 40 minutes' immersion. Many attempts have been made in the past to improve the water resistance of gypsum products. These attempts have included the incorporation of water-resistant material such as metallic soaps, asphalts, waxes, resins, etc., within the calcium sulfate hemihydrate slurry. They have also included attempts to coat the finished gypsum product with water resistant films or coatings. One specific example of past attempts to waterproof gypsum integrally by the addition of water-repellent substances is disclosed in Patent No. 2,198,776 to King and Camp. This shows the incorporation of paraffin wax, asphalt, etc. into the aqueous slurry by spraying the molten material into the slurry.

A further improvement, in which a combination of asphalt and wax is used in certain critical proportions, is described in applicant's copending application Serial No. 585,791, filed March 30, 1945, now Patent No. 2,432,963. That method comprises the addition to the aqueous plaster slurry of an emulsion of wax, such as paraffin wax, and asphalt, in the relative proportions of from about 1 part to about 10 parts of asphalt per part of wax. Since the asphalt is a relatively poor solvent for paraffin wax and similar wax at ordinary temperatures, the solution formed at high temperatures tends on cooling to deposit microscopic wax crystals on the asphalt-wax surface, whereby unusual water-repellent properties are secured. I have found that water forms a negative meniscus with the asphalt-wax surfaces described in said copending application.

It is the object of the present invention to effect further improvements in the preparation of waterproof gypsum products, and a further object to effect these improvements in a simple fashion and with inexpensive materials.

Other objects will become apparent from the ensuing description of the invention.

I have found that these and other desirable objects may be achieved by the addition of certain materials in minor amounts to the plaster slurry-emulsion combination. Specifically, I have found that the addition of small quantities of potassium sulfate increases the waterproofing effect of the emulsion tremendously. This is a completely unexpected and surprising result. While potassium sulfate is known to accelerate the hydration of plaster, it could not be predicted that its use would lead to more effective waterproofing, particularly since other well known accelerators have no such effect. The result appears to be due to a change in the size of the crystals, in the direction of increased thickness and shorter length, whereby there will be a very marked decrease in the total surface area per given weight of gypsum crystals, so that a given amount of the waterproofing material will be more effective because there is less surface to be covered. It is well known when using an accelerator such as terra alba that while the speed of setting is greatly increased, the formed gypsum crystals are very fine, long and thin, and hence have a large total surface. But when potassium sulfate is also present, the crystals formed are relatively short and thick. This can readily be observed under a microscope. There thus is a decided advantage in the conjoint use of the accelerator (the terra alba) and a crystal-structure modifier (the potassium sulfate), as by utilizing the former to get a quicker set, yet the crystals formed are large enough to enable either the use of a lesser amount of the waterproofing material or a better utilization of the amount added.

A further advantage is that variations in the effectiveness of asphalt-wax emulsions are levelled out by the use of the potassium sulfate, so that reasonably accurate prediction of the attainable degree of water-repellence becomes possible.

It will be appreciated that my invention is applicable to a wide variety of gypsum products, including gypsum board, gypsum block, gypsum tile, gypsum casts, etc. The detailed examples which follow should therefore be construed as merely illustrative of my invention, and not as imposing any limitations thereon, except as defined in the appended claims.

Example 1

A series of 2″ x 4″ cylinders was prepared from commercial plaster (calcium sulfate hemihydrate) and a commercial protein-stabilized wax and asphalt emulsion which contained 5.25 parts of asphalt per part of wax. The wax was a commercial form of paraffin wax having a melting point of about 122°–124° F., and the asphalt had a ring-and-ball softening point of about 115° F. A wax melting up to 165° F. and an asphalt melting up to 185° F. may be used. Sufficient emulsion to provide 80 grams of wax-asphalt mixture was diluted with 900 c. c. water. To this diluted emulsion were added 1600 grams of calcined gypsum plus the materials indicated in the following table. The mass was mixed thoroughly and 600 c. c. of a foam were added. This foam was prepared by stirring rapidly (as for instance in a malted milk mixer) 14 c. c. of 20% rosin soap dissolved in 175 c. c. of water at 70° F. until a foam volume of 900 c. c. had been reached. The amount of foam as above stated was stirred into the slurry already containing the emulsion and the slurry was then poured into molds to form 2" x 4" cylinders. After the plaster had set, the cylinders were dried in a circulating air oven at a temperature sufficient to dry the casts without recalcination of the gypsum, but hot enough to melt the asphalt-wax composition therein. About at least 150° F. is required. The dry cylinders were weighed and immersed in water at 70° F. At intervals they were removed, reweighed to determine amount of water absorbed, and replaced in the water bath. The results of the tests were given in the following table, together with the materials added with the plaster and the amounts thereof.

| Additive and Amount | Per cent water absorbed— | |
|---|---|---|
| | in 5 hours | in 24 hours |
| Potassium sulfate, 6 gm | 0.3 | 1.2 |
| Terra alba, 8 gm | 8.0 | 28.2 |
| Terra alba, 8 gm<br>Potassium sulfate, 6 gm | 0.6 | 3.1 |

These results indicate strikingly the unexpected improvement conferred by my invention, even when used in conjunction with other conventional accelerators which confer no improvement in water resistance.

The cylinders containing terra alba (which is ground calcium sulfate dihydrate) are typical of the products secured when omitting the potassium sulfate. The marked reduction in water-absorption is plainly evident, when potassium sulfate is used.

*Example 2*

The commercial emulsion, used in Example 1, was tested in the same fashion as in Example 1, except that only sufficient of the emulsion was used to provide 60 grams of the wax-asphalt mixture. The water absorption results were:

| Additive and Amount using Less asphalt wax | Per cent water absorbed— | |
|---|---|---|
| | in 5 hours | in 24 hours |
| Potassium sulfate, 6 gm | 0.6 | 4.6 |
| Terra alba, 8 gm<br>Potassium sulfate, 6 gm | 8.1 | 30.0 |
| Terra alba, 8 gm | 32.2 | 40.5 |

Although the effect of the potassium sulfate is not so pronounced on the ultimate absorption of the cylinders in this test, it does effect a sharp reduction in the amount of water absorbed in the early stages of the immersion, which from a practical standpoint is extremely important.

*Example 3*

Another commercial emulsion was tested by the method of Example 1, using, respectively, 4, 5, 6, 7, 8, 9, 10, 11, 12, and 13 g. of potassium sulfate per batch (1600 gms. of calcined gypsum) with sufficient emulsion to provide 80 grams of wax-asphalt. All the cylinders showed 0.6% water absorption after 5 hours and 0.9% after 24 hours' immersion. Thus it is evident that the quantity of potassium sulfate is not particularly critical, but may rather be varied to provide the desired setting speed without interfering with its effect on waterproofing. Its remarkable effectiveness is quite inexplicable and totally unexpected.

*Example 4*

An emulsion was prepared by heating 252 parts of asphalt (105° softening point), 48 parts of paraffin wax, and 25 parts of oleic acid to about 200° F. and adding this mixture to 95 parts of a 16.2% casein solution (containing 2.96% KOH and 17.9% borax, based on the casein) and 10 parts of ammonium hydroxide, with vigorous agitation, and thereafter adding 225 parts of hot water.

Cylinders prepared as in Example 1 with sufficient emulsion to give 80 grams of wax-asphalt in the composition gave the following results on the water absorption test:

| Additive and Amount | Per cent water absorption— | |
|---|---|---|
| | In 5 hours | In 24 hours |
| Terra alba, 8 gm | 29.8 | 35.0 |
| Potassium sulfate, 6 gm | 2.6 | 13.7 |

*Example 5*

A commercial run of gypsum board was made in accordance with the formula and method disclosed in my patent Reissue No. 22,816. Produced in this run were half-inch gypsum boards containing no waterproofing, half-inch boards containing a commercial wax-asphalt emulsion added at the rate of 12 gallons of emulsion per one thousand square feet of board, and half-inch boards containing the same proportion of the same emulsion plus potassium sulfate added at the rate of 2 pounds per one thousand square feet of board. Water absorption tests were made on samples from each of these three products:

| Board | Per cent Water Absorption after immersion of— | | | | |
|---|---|---|---|---|---|
| | 1 hr. | 2 hrs. | 3 hrs. | 4 hrs. | 5 hrs. |
| No waterproofing | 46.5 | 47.4 | 47.8 | 48.7 | 49.2 |
| 12 gallons emulsion | 24.5 | 37.7 | 45.6 | 51.0 | 51.8 |
| 12 gallons emulsion plus 2 lbs. potassium sulfate | 5.4 | 12.5 | 18.4 | 23.8 | 28.8 |

This quantity of emulsion, it will be noted, is too small to give, by its use alone, a commercially satisfactory waterproofing. However, when used in conjunction with potassium sulfate, practical waterproofing is effected.

It is well known that potassium sulfate will form with calcium sulfate a double salt (potassium calcium sulfate) known as syngenite. I am not certain whether or not this double salt is formed in my process and product. Therefore, when the term potassium sulfate is used in connection with a set gypsum structure in the appended claims, it is to be understood to include both potassium sulfate as such and potassium sulfate which forms a part of the double salt syngenite.

While the preferred method of this invention involves the use of a ready-made wax-asphalt emulsion which has been dispersed by a protein material, the invention is by no means restricted thereto. One may use other suitable emulsifying materials in conjunction with or as a replacement for proteins, such as soaps, various wetting agents such as the sulfated fatty alcohols, amine soaps, ether-alcohols, substituted sulfonates, various starch and dextrine materials, and the like, as will be obvious to those skilled in the art of emulsions. Many methods of preparing emulsions are described in the literature. Among the publications on the subject are W. Clayton's "Emulsions and Emulsification," Harry B. Weiser's "Colloid Chemistry," and Berkman and Egloff's "Emulsions and Foams."

It is also within the ambit of the invention to prepare emulsions of wax and asphalt separately and to add the requisite quantity of each at the time of use.

As disclosed in the hereinbefore referred to copending application, my preferred proportions of wax and asphalt are from about 1 part to about 10 parts of asphalt per part of wax. I prefer to use between 2% and about 15% of the wax and asphalt mixture, based on the weight of the solids content of the entire mixture. As indicated in the foregoing examples, up to about 0.8% of potassium sulfate, on the same basis, seems to be the most suitable range.

To obtain the optimum waterproofing, I prefer to heat my gypsum products to a temperature above the melting point of the wax-asphalt mixture in order to obtain the best possible coating on the surface of the gypsum crystals. On cooling, the wax crystallizes out of the asphalt and provides the unique water-repellent effect.

I claim:

1. A water resistant gypsum product comprising a set mass of interlaced gypsum crystals containing from about 2% to about 15% of a therein deposited mixture of asphalt and paraffin wax in the relative proportions of from about one part to about ten parts of asphalt per each part of wax, and from about 0.1% to about 0.8% of potassium sulfate.

2. Process of producing a water-resistant gypsum product which comprises adding to a calcined gypsum slurry an aqueous asphalt-paraffin wax emulsion, in which the ratio of asphalt to wax is from about one to ten parts of asphalt to each part of wax, in an amount of from about 2% to about 15% on the weight of the gypsum in said product, together with not exceeding about 0.8% of potassium sulfate in an amount sufficient markedly to improve the water-repellent properties of said product as compared with one devoid of potassium sulfate.

THOMAS P. CAMP.

REFERENCES CITED

The following references are of record in the file of this patent:

UNITED STATES PATENTS

| Number | Name | Date |
| --- | --- | --- |
| 2,078,200 | King | Apr. 20, 1937 |
| 2,198,776 | King et al. | Apr. 30, 1940 |
| 2,212,811 | Hann | Aug. 27, 1940 |
| 2,291,905 | Koenig | Aug. 4, 1942 |
| 2,340,840 | Wiss | Feb. 1, 1944 |
| 2,432,963 | Camp | Dec. 16, 1947 |